Dec. 26, 1967

C. D. MULLINIX 3,360,119

DELUXE BACON PACKAGE

Filed Sept. 8, 1964

5 Sheets-Sheet 1

INVENTOR.
CHARLES D. MULLINIX
BY
Huebner & Worrel
ATTORNEYS.

Dec. 26, 1967 C. D. MULLINIX 3,360,119

DELUXE BACON PACKAGE

Filed Sept. 8, 1964 5 Sheets-Sheet 2

INVENTOR.
CHARLES D. MULLINIX
BY
Huebner & Worrel
ATTORNEYS.

Dec. 26, 1967 C. D. MULLINIX 3,360,119

DELUXE BACON PACKAGE

Filed Sept. 8, 1964 5 Sheets-Sheet 3

INVENTOR.
CHARLES D. MULLINIX
BY
Huebner & Worrel
ATTORNEYS.

Dec. 26, 1967 C. D. MULLINIX 3,360,119

DELUXE BACON PACKAGE

Filed Sept. 8, 1964 5 Sheets-Sheet 4

CHARLES D. MULLINIX
INVENTOR.

BY Huebner & Worrel
ATTORNEYS.

Dec. 26, 1967 C. D. MULLINIX 3,360,119

DELUXE BACON PACKAGE

Filed Sept. 8, 1964 5 Sheets-Sheet 5

INVENTOR.

CHARLES D. MULLINIX

BY

Huebner & Worrel

ATTORNEYS.

United States Patent Office 3,360,119

Patented Dec. 26, 1967

3,360,119
DELUXE BACON PACKAGE

Charles D. Mullinix, 465 Golden Road, Fallbrook, Calif. 92028

Filed Sept. 8, 1964, Ser. No. 406,647
23 Claims. (Cl. 206—45.31)

ABSTRACT OF THE DISCLOSURE

This disclosure relates to the packaging of bacon and other somewhat greasy meats, and comprises, in general, a tray formed with a rim which interlocks with a cooperating flange of a cover, and which cover can be stripped off readily but replaced, the cover being opaque, but with the provision of a transparent window preferably covered by an opaque flap which can be raised to expose the window and through it the contents of the package.

This application is a continuation-in-part of my copending application Ser. No. 389,948, filed Aug. 17, 1964, for Deluxe Bacon Package, now abandoned.

A primary object of the invention is to provide a cover of the character mentioned which is rigid to a degree for imparting a measure of stability to the package; the materials of which it is made preferably are thermoformable; it should be grease resistant; it should afford suitable (controlled) moisture vapor transmission rate in use; it should also have a controlled oxygen diffusion rate; it must be nontoxic; it must be refrigeratable, i.e., able to withstand temperatures involved in freezing meats; its area or at least the major part of it must be opaque to prevent ultra violet discoloration of the contents; and the material providing the upper surface should be printable.

In the presently preferred form of the invention the cover is formed of a unique lamination of materials. High impact styrene and oriented polystyrene are examples of materials which can be combined in laminated form to provide a cover possessing the listed qualities.

High impact styrene is an opaque, readily available, and relatively inexpensive plastic, obtainable in sheet form.

Oriented polystyrene is available as a crystal clear plastic in sheet form which will combine by heat and pressure with high impact styrene, or which can alternatively be combined with high impact styrene by suitable adhesive or solvent lamination techniques.

I have discovered that when sheets of these two materials are laminated and formed to the desired configuration by heat and pressure a highly satisfactory cover can be formed. Either of them can be printed.

In forming the cover the oriented polystyrene may be the lower laminate, the window cutout being made on three sides in the high impact styrene, leaving a hinge line which may be scored, and zone heating can be employed during the lamination and forming procedure so that the window flap will be free to open and close on the hinge provided by the uncut score line. In the event lamination is accomplished by adhesive or solvent bonding in lieu of bonding by heat and pressure, the adhesive or solvent may be applied so as to avoid the area of the window flap, as by printing the adhesive or solvent onto one or both of the laminates.

A procedure generally similar to that in forming the window is also employed to provide a pull tab in the region of one corner of the cover to facilitate initiating a detachment of the cover from its interlocking engagement with the rim of the tray. More specifically, the outline of a pull tab is cut in the high impact styrene and the area defined by the cut is left heat free, or free of adhesive or solvent, as the case may be, during the laminating and forming procedure. If desired, the outline of the pull tab may be interrupted at one or more points by use of a nicked die to assure that the pull tab will lay flat prior to use.

An alternative to zone heating is to print the areas of the window and pull tab with silicon or some other suitable agent to prevent adhesion when the heat is applied. This can be done as a precaution even when zone heating is employed.

Another pull tab arrangement for initiating separation of the cover from the tray comprises a tab projecting outwardly from the rim of the tray at a corner thereof, a portion of this tab being overlapped by a down-turned outer edge of the cover. An outward pull on this tab causes a corner of the cover to be lifted relative to the tray. A second tab, projecting outwardly from the corner of the cover and adjacent to the tab on the rim of the tray, may be employed to further assist separation of the cover from the tray.

In the presently preferred form of the invention substantially the entire area of the cover, aside from the window flap and possibly the first type of pull tab mentioned above, comprises the unique lamination of high impact styrene and clear oriented polystyrene. However, if desired, the cover can be composed principally of the high impact styrene, with a patch of the clear oriented polystyrene extending across the window cutout and laminated under the high impact styrene around the edge of the cutout. Also, if desired, the oriented polystyrene laminate may comprise a strip considerably narrower than the window cutout, this strip extending the length of the cover.

Further details of the structure and the method of forming it will become apparent from the detailed description which follows taken in conjunction with the drawings.

Figure 1:
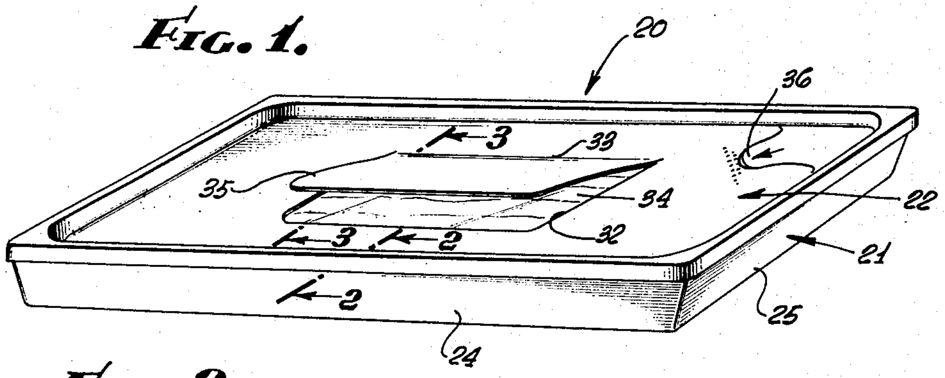
FIGURE 1 is a perspective view of one form of my assembled package.

In the form of the invention illustrated in FIGURES 1–6 the package 20 comprises a tray 21 and a cover 22. The tray may be constructed of relatively stiff paper board or other suitable stiff material which will maintain its shape and provide a satisfactory rim, and comprises a bottom 23, side walls 24 and end walls 25.

The walls are formed with a peripheral rim 26 which may be produced by bending a marginal edge section 27 down to lay flat against the side and end walls, but with an inwardly directed flange 28, the latter providing a spring-like stop element.

Figures 2, 3, 4, 5, 6:
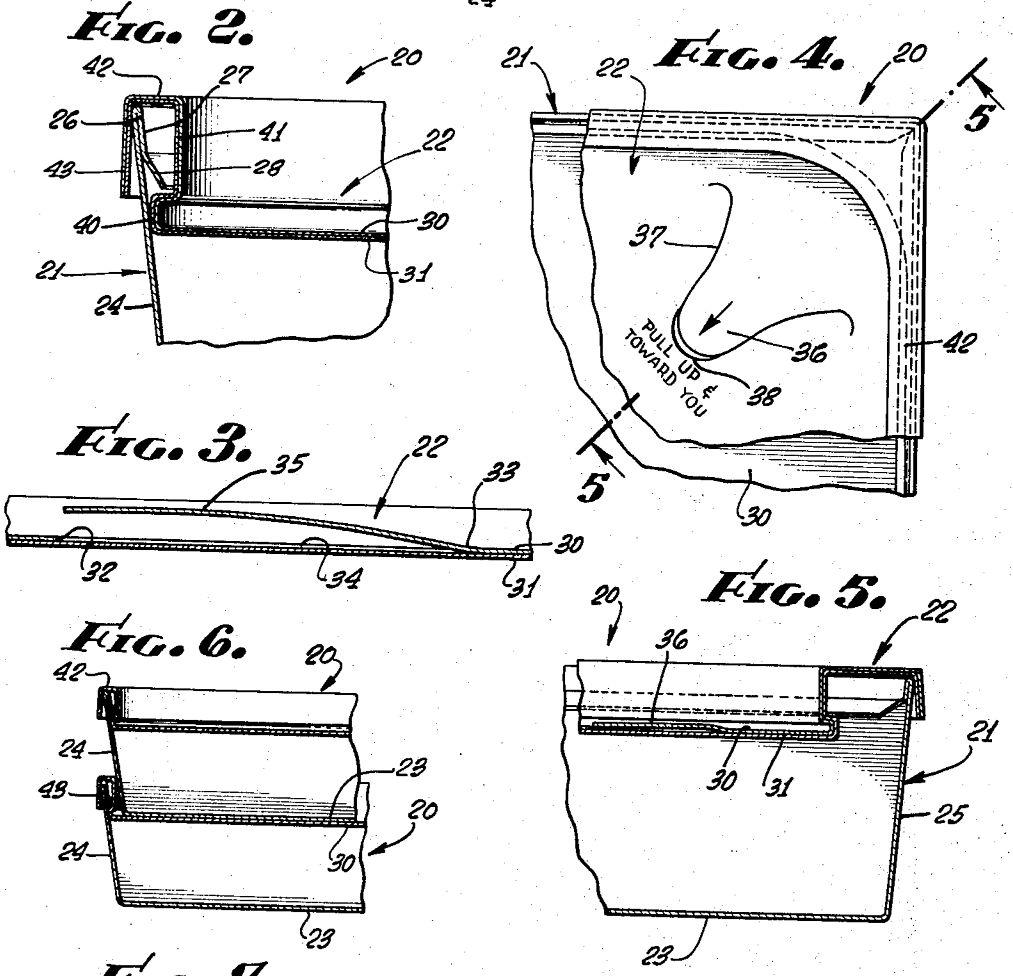
FIGURE 2 is an enlarged fragmentary vertical cross-section taken on the line 2—2 of FIGURE 1.
FIGURE 3 is a similar cross-section taken on the line 3—3 of FIGURE 1.
FIGURE 4 is a top plan view with parts cut away illustrating a corner region of the package shown in FIGURE 1.
FIGURE 5 is a fragmentary vertical cross-section taken on the line 5—5 of FIGURE 4.
FIGURE 6 is a vertical section illustrating the manner of stacking the packages.

This flange 28 may be omitted in the corners, or at least be rendered ineffective in the corner where the pull tab of the cover is to be located, as illustrated in FIGURE 5 by curving a locking flange 40, later described, free of the rim, so that at least the one corner is free of the interlocking feature which will facilitate initiating the removal of the cover from the tray.

The cover illustrated in FIGURES 1–6 comprises an upper laminate 30 and a lower laminate 31. The materials employed for these laminates should be relatively unaffected by animal fats; the upper one should be generally opaque and have a surface which can be printed; the lower laminate should be clear and transparent; and the materials should be thermoformable and preferably thermoadhesive one to the other, and possess the other qualities mentioned heretofore. As stated previously, I have found that requirements are ideally met by employing high impact styrene for the upper laminate and oriented polystyrene for the lower laminate. These are compatible, both will stretch a like amount under heat, they can be welded together and after welding can be thermoformed. Reference to these materials is by way of example, and not of limitation.

Although the layers 30 and 31 are preferably laminated together by thermoadhesive bonding, which has advantages of low cost and speed, they may alternatively be bonded by use of a suitable adhesive material, or by applying a suitable solvent to one or both of the mating surfaces. The adhesive or solvent may be heat activated, if desired. The adhesive or solvent should be non-toxic and moisture resistant, and also preferably grease resistant. If an adhesive is used it should have good low temperature flexibility because the package is intended for meats that are normally refrigerated.

The upper laminate has a window cutout 32, an imaginary line 33 which may be weakened as by scoring, if desired, forming a hinge along one side providing a window flap which is free of the surface of the lower laminate. Thus, a transparent window 34 is provided which is normally closed by an opaque flap 35, the latter being liftable for inspection of the contents.

At one corner a pull tab 36 is outlined by a cut 37, and a thumb notch 38 preferably is provided. It is desirable that the grain of the laminate in which the pull tab is formed lay angularly to the longitudinal axis of the pull tab to minimize a stripping of the pull tab from the laminate when it is lifted to release the corner of the cover. The pull tab outline preferably is generally triangular with an oval apex region, and with reverse curves at the base to minimize any tendency for the tab to strip through to the edge of the cover. Also, its edges may be nicked as mentioned heretofore.

At least the major portion of the perimeter of the cover is provided with a horizontally extending locking flange 40, above which is a vertical wall section 41, an overlying horizontal ledge 42 and an outward, downward protective lip 43.

The configuration described can be achieved during the laminating and forming operation. If the lamination is accomplished by heat and pressure, freedom of the window flap 35 and the pull tab 36 may be preserved by zone heating, i.e., omitting the heat and pressure in the defined areas, or by applying silicon or any suitable medium between the two sheets which will prevent adhesion, or at least will provide a readily severable condition, or by a combination of both expedients. If, on the other hand, the layers are adhesive or solvent laminated, then freedom of the window flap 35 and the pull tab 36 may be preserved by shielding these areas from the adhesive or solvent materials. This can be accomplished by printing a desired pattern of the adhesive or solvent on one or both of the sheets.

The cover is applied to the tray by pressing down vertically. During this operation the flange 40 will spring the stop element 28 outwardly until the flange 40 passes, whereupon the stop element 28 will spring back inwardly and the lower edge thereof will offer an interlocking engagement with the upper surface of the flange 40. However, when it is desired to open the package, the housewife may grasp the corner of the cover or lift the pull tab 36 and pull the corner loose in that manner, whereupon a firm grasp may be maintained on the cover to complete the removal thereof.

The material of the tray is sufficiently yieldable that the stop element 28 will give way for the opening operation.

It is desirable, also, to eliminate the flange 28 at the corner region, as shown in FIGURE 5, to facilitate the start of the opening operation.

The form of package illustrated in FIGURES 8–11 employs a plastic tray 50, preferably formed with fluting 51 in the walls for reinforcement purposes and for an accordion type expansion or contraction, and with a horizontal ledge 52 extending outwardly, from which rises an upstanding, hollow, marginal bead 53. This bead is preferably of general horseshoe form to provide a wedging engagement with a keystone shaped hollow flange 54 on the cover 55. The inner wall of the bead 53 may be obliquely straight, as indicated at 56, and the outer wall preferably is formed with a reverse edge curve 57.

The cover 55, which may be laminated and formed of the same materials as previously described for the cover, may advantageously embody circumferential fluting 60 and window outline fluting 61 for stiffening reinforcement. This form of cover also includes a slanted side and end wall section 62 which corresponds to the outer slanted wall section 63 of the tray, and a horizontal circumferential strip 64 which is parallel to the ledge 52. The keystone shaped hollow flange 54 rises from the strip 64, and the flange preferably terminates at its outside, downward region in a reverse curved section 65 which bears against the reverse curve 57 of the bead 53.

Figures 8, 9, 10, 11, 12, 16:
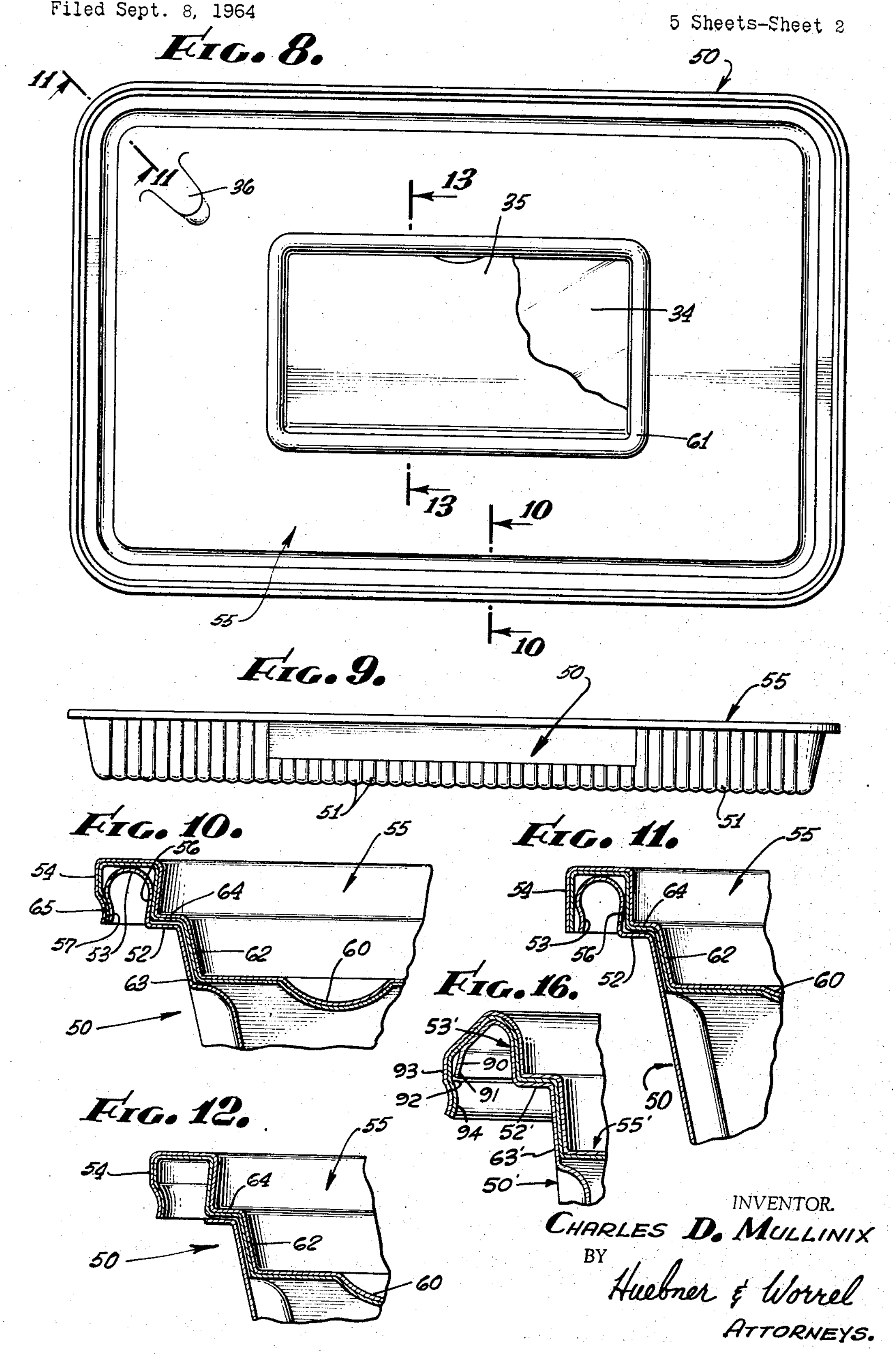
FIGURE 8 is a top plan view of another form of the package.
FIGURE 9 is a side elevation of the latter package.
FIGURE 10 is an enlarged fragmentary vertical section taken on the line 10—10 of FIGURE 8.
FIGURE 11 is a similar view taken across one corner on line 11—11 of FIGURE 8.
FIGURE 12 is a view similar to FIGURE 11 showing a different form of corner construction of the tray.
FIGURE 16 is a fragmentary vertical section showing a different form of tray rim and cover configuration.

When the cover is pressed into place the bead 53 resiliently yields and then expands to interlock in the flange 54, as shown in FIGURE 10.

In the general corner region, as shown in FIGURE 11, the vertical walls of the flange 54 may be straight and parallel so that there is no interlocking other than a simple frictional fit between the flange and tangential surfaces of the bead 53 to render the start of the cover stripping easy.

An alternative, illustrated in FIGURE 12, is to eliminate the bead 53 in the corner region in which event there need be no modification of the flange 54, as it performs no interlocking function in the region where the bead is missing.

Another form of tray 50′ rim and cover interlock is shown in FIGURE 16. Here the upper edge of the tray includes a slanted wall section 63′ and a horizontal ledge 52′. The bead 53′, however, instead of having a horseshoe cross-sectional design, has an inverted distorted V-cross-sectional outline. This terminates at the outside margin in a locking flange 90 which declines downwardly and outwardly.

The cover 55′ has a peripheral flange construction with a cross-sectional contour generally parallel to the adjacent parts of the tray. However, there preferably is a slight angle between the locking flange 90 of the tray and the adjacent vertical wall section 93 of the cover. A notch 92 at the intersection of the part 93 and the curved edge portion 94 provides a releasable interlock with the lower edge 91 of the flange 90.

The forms of package, illustrated in FIGURES 8–12, and 16, will conveniently nest in the same general manner as illustrated in FIGURE 6, all forms of trays having slanting side and end walls, the bottom outlines of which generally coincide with or are smaller than the inner outline of the countersunk section of the cover structure. This nesting provides an interlocking for neat, stacked display of a large number of the packages in markets, which is not possible with conventional packages for bacon and the like.

Figure 14:
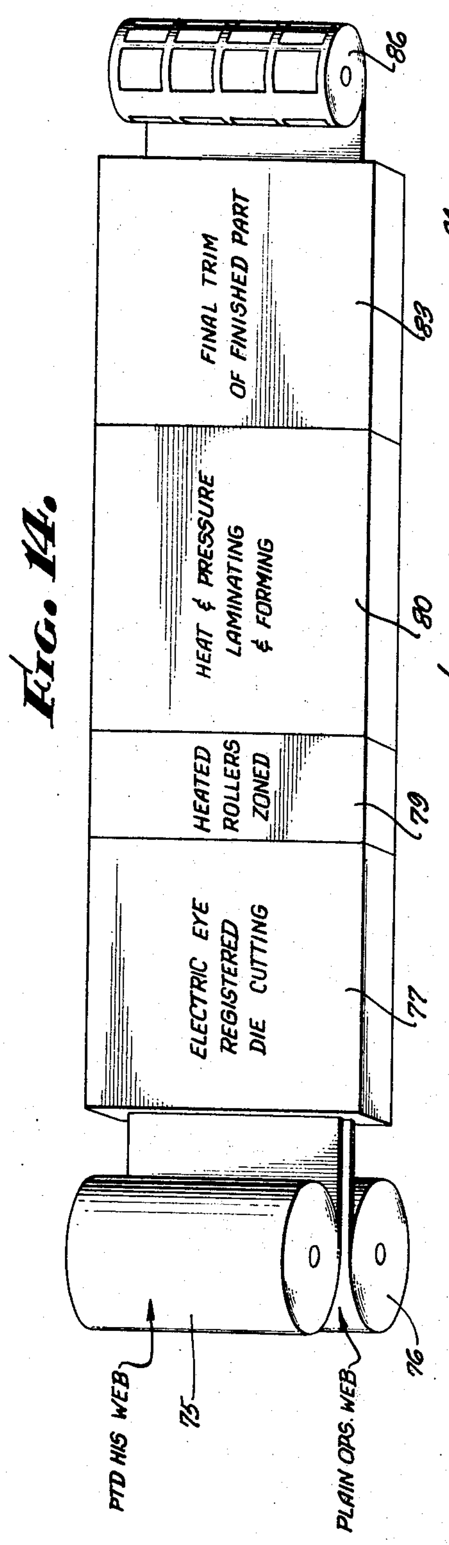
FIGURE 14 is a top plan view partly in perspective illustrating diagrammatically an apparatus and method for forming the cover.
Figure 15:
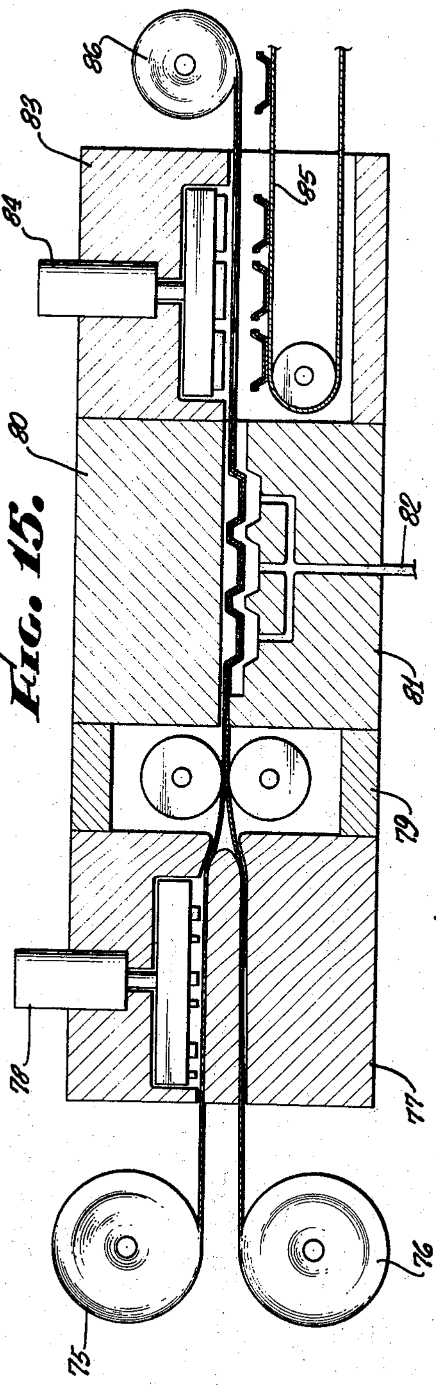
FIGURE 15 is a side elevation with parts in section, further illustrating the apparatus and method of FIGURE 14.
Figure 13:
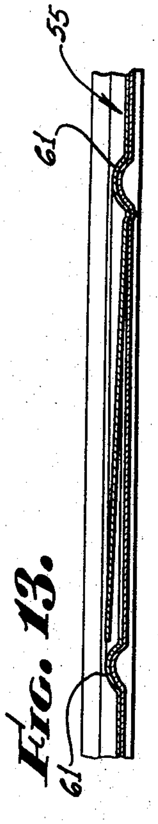
FIGURE 13 is a vertical fragmentary section taken on the line 13—13 of FIGURE 8.

The trays for the package may be manufactured by any conventional or other desired method. The covers are adaptable to manufacture by a continuous process in an automatic machine, which is diagrammatically illustrated in FIGURES 14 and 15. A roll 75 of high impact styrene which previously has been printed with suitable labelling information and correctly spaced indicia for actuating an electric eye, is suitably maintained in the apparatus. Below the roll 75 is suitably positioned a roll of clear oriented polystyrene 76. These are drawn separately through a die cutting station 77 so that no operation is performed on the oriented polystyrene web. However, the high impact styrene web is properly cut by a die 78 to form the inspection window flap and the pull tab with the thumb notch and any scoring desired in connection with these elements.

At the succeeding station 79 heated rollers having suitable cutouts or zone heating expedients to register with the windows and pull tabs apply heat and pressure to the two webs as they are brought together, thereby tack laminating the two sheets. As an alternate to using zone heating in the rollers, the areas where lamination is not desired may be printed previously with silicon to prevent adhesion, or both provisions may be utilized. If lamination is by heat activated adhesive or solvent material, such may be applied to one or both of the sheets as required in advance of the rollers by suitable applicator means (not shown), and heat and pressure may be applied by the rollers to bond the sheets together.

From the station 79 the laminated sheet moves through a station 80 wherein a suitable female die 81 provided with vacuum and air pressure means generally designated 82 is utilized to form the covers by sucking the tacky laminate down into cavities and then chilling by water.

At the next station 83 a die 84 cuts and trims a plurality of formed covers out of the web and delivers them to an endless belt 85. The skeleton web from which the covers have been cut is rolled up at 86 and can be reclaimed for various purposes.

Figure 17:
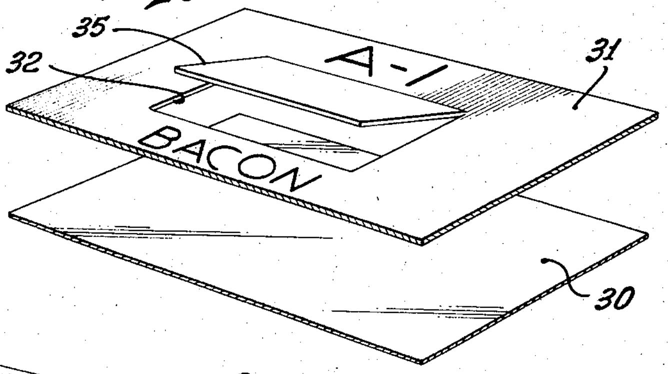
FIGURE 17 is a perspective exploded view of a fractional portion of the cover embodying the form of FIGURE 1 wherein the opaque sheet is uppermost and the transparent sheet lowermost, the upper sheet being printed on its upper surface.

In FIGURE 17, a fraction of the cover structure of FIGURE 1 is shown, embodying label printing as, for example, "A–1" and "Bacon" on the upper surface of the opaque upper sheet.

Figure 18:
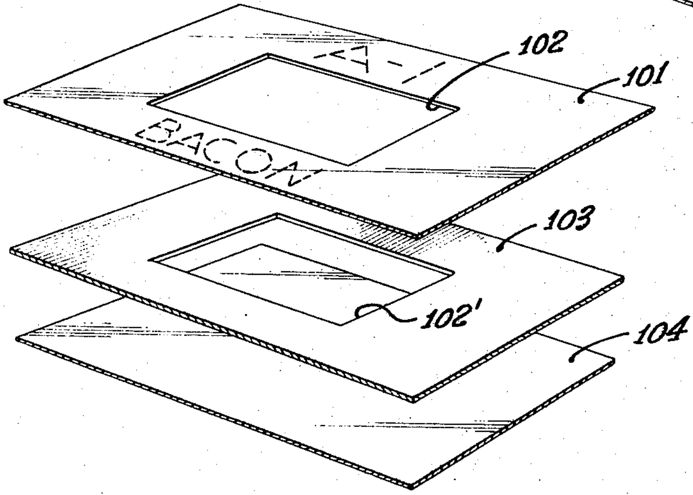
FIGURE 18 is an exploded view of a package cover comprising three sheets of laminate, but no flap over the window.

An alternative structure is shown in FIGURE 18 wherein three sheets are laminated, the upper one 101 being clear and transparent, and containing a flapless window cutout 102, registering with a window cutout 102′ in an intermediate opaque sheet 103, and a full transparent lower sheet 104.

A feature of this arrangement is in respect to the printing of the label information. A material should be employed, such for example, as oriented polystyrene, which can be printed. Here there can be an advantage in reverse printing the "A–1" and "Bacon" on the underside of sheet 101. Such locked in printing will not smear, will show clearly through the transparent sheet and enables the upper surface of the latter to retain a high gloss uninterrupted finish.

Figure 19:
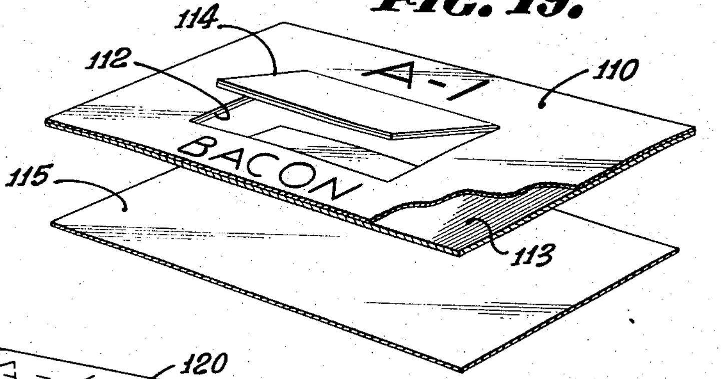
FIGURE 19 is a view generally similar to FIGURE 18 wherein a window flap is incorporated.

In FIGURE 19, the construction is generally similar to FIGURE 18, but with the upper transparent sheet 110 and the intermediate opaque sheet 113 both incorporating a window cutout 112 with an overlying window flap 114, and a lower transparent sheet 115 provides the protection over the cutout. In this case the printing appears on the upper surface of the sheet 110.

Figure 7:
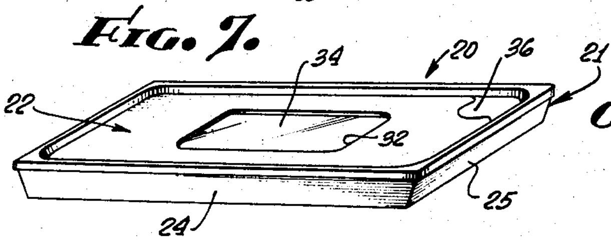
FIGURE 7 is a perspective view of a package similar to that shown in FIGURE 1, except that the window flap is omitted, the transparent window being exposed.
Figure 20:
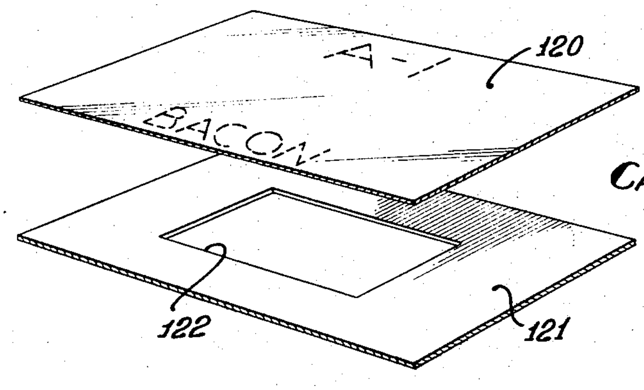
FIGURE 20 is an exploded view of a two laminate cover without a window flap in which the transparent sheet is uppermost.

FIGURE 20 illustrates an alternative arrangement to FIGURE 7 with the transparent sheet 120 uppermost, the printing "A–1" and "Bacon" locked in on the under surface, and a lower opaque sheet 121 embodying an open window cutout 122.

Figure 21:
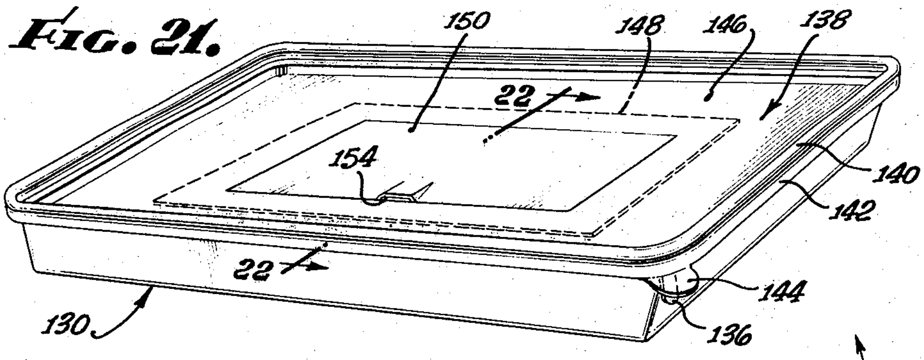
FIGURE 21 is a perspective view illustrating a further form of package, wherein the lower laminate is a transparent sheet in the form of a window patch, with the window flap having a raised finger grip, and outwardly projecting pull tabs on a corner of the cover and tray.
Figures 24, 25:
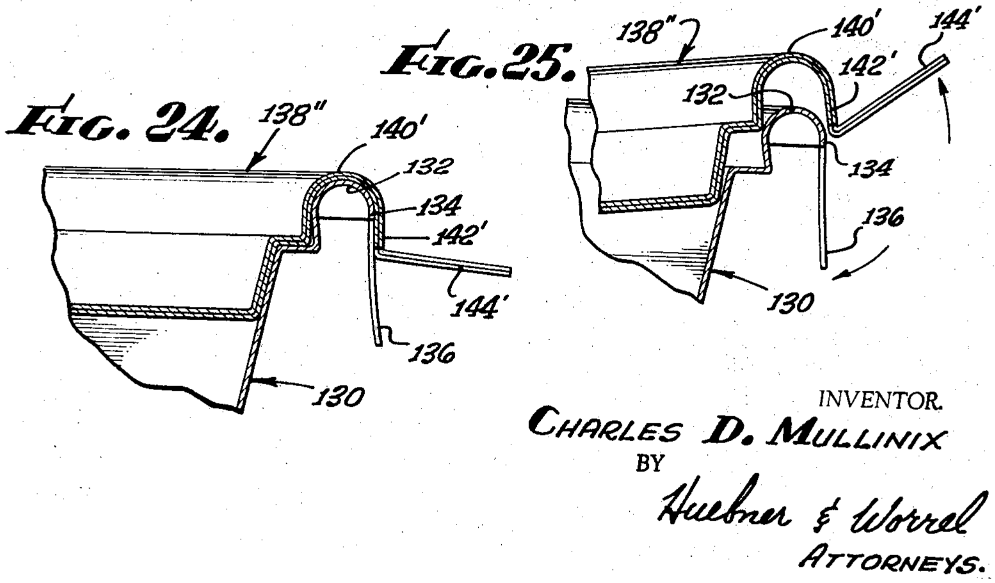
FIGURE 24 is an enlarged fragmentary vertical section taken through a corner of a package similar to that shown in FIGURE 21 but with a full laminar cover structure rather than the patch window lamination, further illustrating a pull tab arrangement like that shown in FIGURE 21, with the cover fully engaged over the tray.
FIGURE 25 is a view similar to FIGURE 24, but with separation of the cover from the tray initiated.

The tray 130 illustrated in FIGURES 21, 24 and 25 may be composed of high impact styrene or other suitable plastic material. This tray 130 has a peripheral structure similar to the tray 50 shown in FIGURES 8 to 11, having a marginal bead 132. The bead 132 has a downwardly directed outer wall 134, and a pull tab 136 is formed on the lower edge of outer wall 134 so as to project generally downwardly therefrom in the region of one of the corners of the tray.

Figure 22:
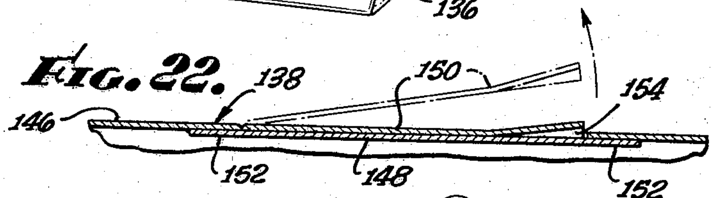
FIGURE 22 is a vertical section taken on the line 22—22 of FIGURE 21, further illustrating the window patch and the raised finger grip on the flap.

The cover 138 shown in FIGURES 21 and 22 includes a downturned hollow flange 140 which is frictionally engageable over the bead 132 on the tray. The downwardly directed outer wall 142 of flange 140 has a pull tab 144 integrally formed thereon and preferably formed with an outward bend so that it is separated from tab 136 on the tray. Further details of these tabs and their operation will be described in connection with FIGURES 24 and 25.

The cover 138 of FIGURES 21 and 22 may be laminated and formed of the same materials as previously described for the cover. However, whereas in the previous covers the upper and lower laminates were generally coextensive, the cover 138 is formed principally of the upper layer 146 of opaque high impact styrene. The lower layer of clear oriented polystyrene is employed in the form of a patch 148 which extends across the window area under the flap 150 formed in the upper layer 146. The patch 148 is somewhat larger than the actual window area so as to have a peripheral portion 152 that is laminated to the upper layer 146 in the region adjacent to the window.

The flap 150 shown in FIGURES 21 and 22 has a finger grip 154 on the free edge thereof to facilitate opening of the flap. Grip 154 preferably comprises a heat formed raised section of the flap, and it may be sufficiently low so that any light passing thereunder would be inconsequential. The raised grip 154 provides ventilation for the window area, thereby decreasing the likelihood that moisture will condense on the window and fog same.

Figure 23:
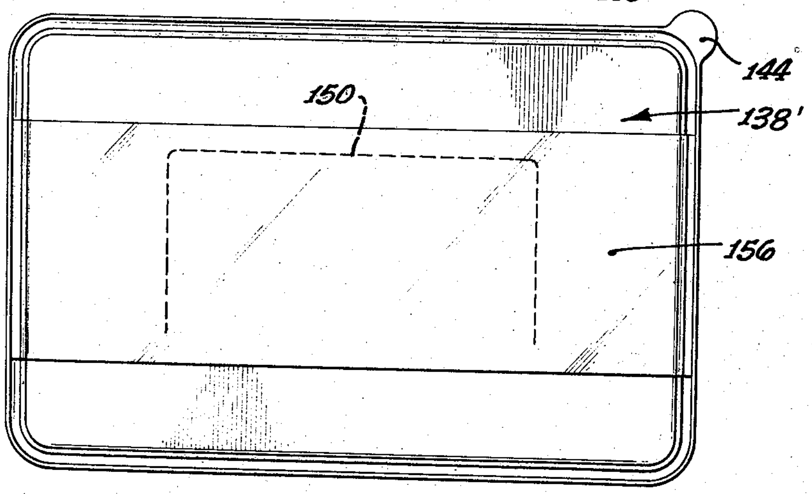
FIGURE 23 is a bottom plan view of a cover which is similar to the cover shown in FIGURE 21, but in which the lower laminate is in the form of a strip of the transparent sheet material extending the length of the cover.

FIGURE 23 illustrates a form of cover 138' which embodies the same upper layer 146 as the cover 138 in FIGURES 21 and 22, but has a strip type of window instead of the patch window of cover 138. Thus, in cover 138' the lower layer of clear oriented polystyrene is in the form of a strip 156 which extends from one end of the cover to the other and is somewhat wider than the window cutout. The strip 156 and upper layer 146 are laminated as aforesaid.

Referring now to FIGURES 24 and 25, the cover 138'' that is there illustrated is similar in peripheral shape to the covers 138 and 138', but has coextensive upper and lower laminations. This is preferred so that the pull tab 144' thereon will have the added tensile strength afforded by the laminar structure.

Separation of the cover from the tray may be initiated by grasping the upper pull tab 144' between the thumb and forefinger of one hand, and the lower pull tab 136 between the thumb and forefinger of the other hand, and then pulling upwardly on the upper tab 144' and downwardly on the lower tab 136. FIGURE 24 shows the cover in its fully seated position on the tray, and FIGURE 25 shows the cover and tray partially separated after thus pulling in opposite directions on the two tabs.

Separation of the cover from the tray is facilitated by placement of the tabs at one corner of the package. Application of the separating force at a corner causes the hollow peripheral flange 140' to peel off of the bead 132 of the tray starting at the corner and then progressing along one side and one end therefrom. Also, such corner placement of the tabs permits the tabs to be cut out of materials which would otherwise constitute waste.

It is to be noted that the outer wall 142' of the flange 140' overlaps the outer wall 134 of the bead 132 so that the lower edge of wall 142' extends below the lower edge of wall 134, as shown in FIGURE 24. With this construction a sufficient lifting force can usually be applied to the outer wall 142' of the flange on the cover to initiate separation of the cover from the tray by merely pulling outwardly (to the right in FIGURE 24) on the lower tab 136, the tab 136 bending outwardly and being forced against the lower edge of the outer wall 142' of the flange on the cover. Accordingly, if desired, the upper tab 144' may be eliminated and separation can still be initiated by an outward pull on the single lower tab 136.

If the tray 130 is formed from a sheet of plastic material such as high impact styrene the pull tab 136 preferably will be cut from unformed sheet material at the corner of the tray which would otherwise constitute waste. Since such sheet material is in a generally horizontal plane as viewed in FIGURES 24 and 25, the tab 136 would project generally horizontally and to the right from the lower edge of the outer wall 134 of bead 132. However, when the cover member 138'' is snapped into place as shown in FIGURE 24, the overlapping outer wall 142' of the cover flange 140' will bend the tab 136 downwardly to approximately the position shown in FIGURE 24, which is the preferred operative position for the tab 136.

While the instant invention has been shown and described herein in what is conceived to be the most practical and preferred embodiments, it is recognized that departures may be made therefrom within the scope of the invention, which is therefore not to be limited to the details disclosed herein but is to be accorded the full scope of the claims so as to embrace any and all equivalent products and methods.

What I claim as new and desire to secure by Letters Patent is:

1. A cover for a package tray having a marginal resilient rim formed with a latching element, said cover comprising a generally flat section bordered by a hollow flange adapted to register with the tray rim, said flange having a cross-sectional form including retaining means to yieldably interlock with the latching element of the tray, and the cover being thermoformed from a laminated web comprising an upper sheet of non-transparent printable high impact styrene and a lower sheet of clear transparent oriented polystyrene, the high impact styrene having a window cutout therein exposing a protective window provided by the oriented polystyrene.

2. A cover as defined in claim 1 in which there is provided a pull tab near one edge formed by a cut in the high impact styrene only, the two sheets not being bonded together in the area outlined by the cut and the pull tab can be readily lifted out of contact with the underlying oriented polystyrene.

3. A cover as defined in claim 2 in which the window cutout in the high impact styrene is peripherally discontinued to provide a hinged flap and in the area outlined by the flap the two sheets are not bonded together and the flap can be readily lifted out of contact with the underlying oriented polystyrene for inspection of the package contents.

4. A cover as defined in claim 1 in which the package is rectangular and the retaining means of the flange is discontinued in a corner region to facilitate detachment of the cover from the tray.

5. A cover as defined in claim 1 in which the package is rectangular and the retaining means of the flange is discontinued in a corner region to facilitate detachment of the cover from the tray, and there is provided adjacent said corner region a pull tab near one edge formed by a cut in the high impact styrene only, the two sheets not being bonded together in the area outlined by the cut and the pull tab can be readily lifted out of contact with the underlying oriented polystyrene.

6. The combination of: a relatively rigid thin walled tray having upstanding walls terminating in a rim embodying depressible latch elements, and a stiff snap-on cover comprising a generally flat section bordered by a hollow flange which registers with said rim, the flange embodying retaining means yieldably interlocking with the latch elements, the cover comprising an upper sheet of opaque printable high impact styrene and a lower sheet of clear transparent oriented polystyrene, the high impact styrene having a window cutout therein exposing a protective window provided by the oriented polystyrene, the two sheets being thermo laminated together and formed.

7. The combination of: a relatively rigid thin walled tray having upstanding walls terminating in a rim embodying a depressible latch element, said latch element comprising a reverse fold of the upstanding walls terminating in a lower edge portion transversely spaced from said walls to provide a resilient, transversely shiftable, engagement surface, and a stiff snap-on cover comprising a generally flat section bordered by a hollow flange which registers with said rim, the flange embodying retaining means yieldably interlocking with the latch elements, said retaining means comprising a surface on said flange underlying the lower edge portion of the latch element when the tray and cover are assembled together, the cover comprising one sheet of opaque material and at least one sheet of clear transparent material, the structure including a window cutout at least in the opaque material exposing an inspection window, the window being protected by at least one sheet of clear transparent material, said cover being generally rigid imparting a measure of stability to the package, said cover also being grease resistant and having a controlled moisture transmission rate and an oxygen diffusion rate, being nontoxic and refrigeratable, and the sheets of said cover being printable.

8. A cover for a package tray having a marginal resilient rim formed with a latching element, said cover comprising a generally flat section bordered by a hollow flange adapted to register with the tray rim, said flange having a cross-sectional form including retaining means to yieldably interlock with the latching element of the tray, and the cover being thermoformed from a laminated web, comprising one sheet of opaque high impact styrene and at least one sheet of clear transparent oriented polystyrene, the structure including a window cutout at least in the opaque high impact styrene exposing an inspection window, the window being protected by at least one sheet of clear transparent oriented polystyrene, said cover being generally rigid imparting a measure of stability to the package, said cover also being grease resistant and having a controlled moisture transmission rate and an oxygen diffusion rate, being nontoxic and refrigeratable, and the sheets of said cover being printable.

9. A combination as defined in claim 7 in which the opaque material is high impact styrene and the clear transparent material is oriented polystyrene.

10. A combination as defined in claim 7 in which clear transparent material is the uppermost laminate and label indicia is reverse printed on its under surface providing locked in printing visible and legible through its upper surface.

11. The combination of a package tray having a marginal resilient rim formed with a latching element, and a snap-on cover comprising a generally flat section bordered by a hollow flange adapted to register with the tray rim, said flange having a cross-sectional form including retaining means to yieldably interlock with the latching element of the tray, the cover being formed from a sheet of opaque material having a window cutout therein exposing an inspection window, the window being protected by a sheet of clear transparent material extending over the entire area of the window and laminated to the opaque material at least in the region thereof adjacent to the window, a pull tab cut in the opaque material, the latching element and the retaining means being free of interengagement in the region of the pull tab, said cover being generally rigid imparting a measure of stability to the package, said cover also being grease resistant and having a controlled moisture transmission and an oxygen diffusion rate, being nontoxic and refrigeratable, and the sheets of said cover being printable.

12. A combination as defined in claim 11 wherein said sheets of opaque and transparent material are substantially coextensive and are laminated togther over the major portion of the area thereof except for the area of said window cutout and the area of said pull tab.

13. A combination as defined in claim 11 wherein said sheet of transparent material comprises a patch of the transparent material which is materially smaller than the sheet of opaque material so as to be laminated to the opaque material only along a strip thereof adjacent to the window cutout.

14. A combination as defined in claim 11 wherein said sheet of transparent material comprises an elongated strip of the transparent material which extends longitudinally from one edge of the cover to the opposite edge but is materially narrower laterally than the cover, said sheets being laminated together over the major portion of the area of said transparent sheet except for the area of said window cutout and the area of said pull tab.

15. A combination as defined in claim 11 in which the opaque sheet is the uppermost laminate, and the window cutout in the opaque sheet is peripherally discontinued to provide a flap and in the area outlined by the flap the two sheets are not bonded together, the flap having a finger grip formed thereon and comprising a raised section of the flap at the free edge thereof, the flap being readily lifted out of contact with the underlying transparent sheet for inspection of the package contents by lifting upwardly on the finger grip.

16. The combination of: a relatively rigid thin walled tray having upstanding walls terminating in a rim embodying a bead having a downwardly extending outer wall, and a snap-on cover comprising a generally flat section bordered by a hollow flange with a downwardly extending outer wall, said flange being engageable over said bead in yieldably interlocking relationship with the bead and with said outer walls of the bead and flange disposed adjacent to each other, and a pull tab integrally formed on said outer wall of the bead and extending generally downwardly from the bead, said pull tab providing means at the margin of the tray for applying a downward force to the edge of the tray to initiate separation of the tray and cover, the cover being thermoformed from a sheet of opaque material having a window cutout therein exposing an inspection window, the window being protected by a sheet of clear transparent material extending over the entire area of the window and laminated to the opaque material at least in the region thereof adjacent to the window, said cover being generally rigid imparting a measure of stability to the package, said cover also being grease resistant and having a controlled moisture transmission and an oxygen diffusion rate, being nontoxic and refrigeratable, and the sheets of said cover being printable.

17. The combination defined in claim 16, wherein said outer wall of the flange extends downwardly below the lower edge of said outer wall of the bead, and said pull tab on the bead is flexible, whereby separation of the tray and cover can be initiated by pulling outwardly on the pull tab to apply an upward force to the lower edge of the outer wall of the flange on the cover.

18. The combination defined in claim 16, which includes a second pull tab integrally formed on said outer wall of the flange on the cover and extending generally outwardly from the flange, whereby separation of the tray and cover can be initiated by grasping one pull tab in one hand and the other pull tab in the other hand and simultaneously pulling downwardly on the tab attached to the bead on the tray and upwardly on the flange of the cover.

19. The combination defined in claim 18, wherein the tray and cover are generally rectangular in shape, and said pull tabs are disposed at one corner of the rectangle.

20. The combination defined in claim 18, wherein said sheets of opaque and transparent material are substantially coextensive and are laminated together over the major portion of the area thereof except the area of said window cutout, said pull tab on the flange being included in said laminated portion.

21. The combination defined in claim 16, wherein said tab on the bead projects outwardly generally horizontally from the bead in the position of repose of the tab before the flange of the cover is fully engaged over the bead of the tray, said outer wall of the flange extending downwardly below the lower edge of said outer wall of the bead, whereby when the flange is pressed down into full engagement over the bead it will bend the tab downwardly into the operative position of the tab wherein the tab extends generally downwardly from the bead.

22. A combination as defined in claim 7, in which the lower edge portion of the latch element is disposed outwardly of the upstanding walls, and the surface on the flange which underlies said edge portion is disposed externally of said walls.

23. A combination as defined in claim 7, in which the lower edge portion of the latch element is disposed inwardly of the upstanding walls, and the surface on the flange which underlies said edge portion extends outwardly toward said walls.

References Cited

UNITED STATES PATENTS

| | | | |
|---|---|---|---|
| 1,608,159 | 11/1926 | Bergmann | 206—46 |
| 2,465,841 | 3/1949 | Bonini | 229—87 |
| 2,673,806 | 3/1954 | Colman | 206—46 |
| 2,963,215 | 12/1960 | Saidel et al. | 229—87 |
| 2,973,086 | 2/1961 | Thompson | 206—45.51 |
| 3,061,087 | 10/1962 | Scrivems et al. | 206—63.2 |
| 3,101,864 | 8/1963 | Glickman | 220—60 |
| 3,214,074 | 10/1965 | Schechter | 206—46 |
| 3,262,602 | 7/1966 | McConnell et al. | 220—60 |

THERON E. CONDON, *Primary Examiner.*

LOUIS G. MANCENE, *Examiner.*

G. T. HALL, *Assistant Examiner.*